Aug. 21, 1956 H. W. McGAFFEY 2,759,767
DISH WASHING APPLIANCE
Filed Dec. 21, 1954
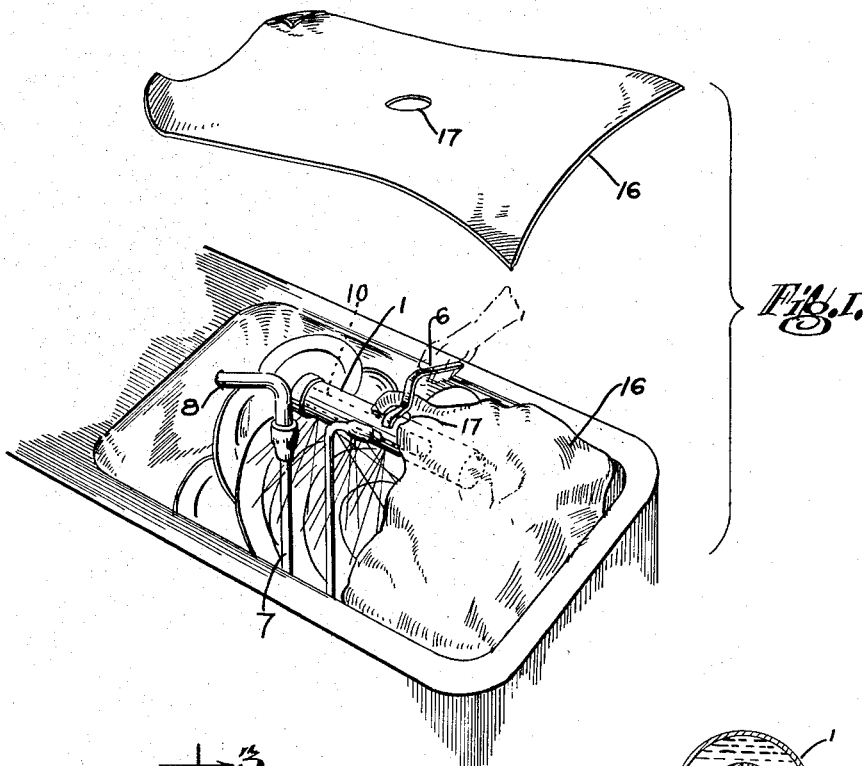
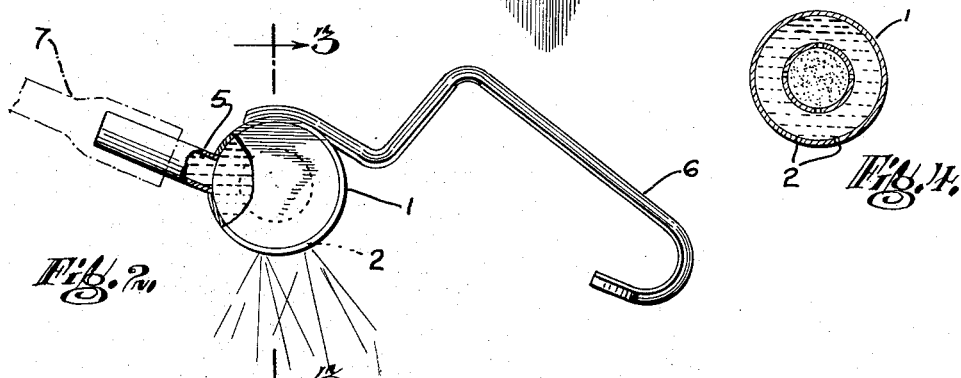
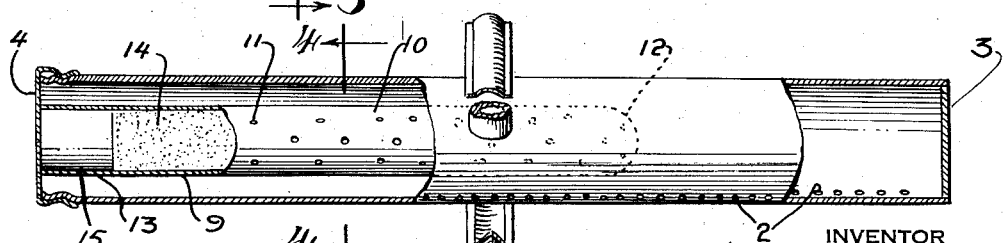
INVENTOR
Hildred W. McGaffey
BY
Kenyon & Kenyon
ATTORNEYS

United States Patent Office 2,759,767
Patented Aug. 21, 1956

2,759,767

DISH WASHING APPLIANCE

Hildred W. McGaffey, Loudonville, N. Y.

Application December 21, 1954, Serial No. 476,765

2 Claims. (Cl. 299—83)

This invention relates to dish washing appliances and in particular to spray appliances in which the dishes are sprayed with water and a detergent.

One of the objects of the invention is to provide such an appliance which is simple in construction and which may be operated easily by any housewife.

Another object is to provide such an appliance in which the detergent may be easily and quickly placed for use.

Another object is to provide such an appliance which can be used in an ordinary sink without excess in splashing of water or detergent.

Another object is to provide such an appliance which can be made easily and inexpensively so that it can be retailed at a low price.

Further objects and advantages of the invention will be apparent from the following description wherein a preferred form of the invention is disclosed by way of illustration it being understood, however, that the invention is not limited to the specific form of the invention disclosed.

In the drawings:

Fig. 1 is a perspective view showing an appliance embodying the invention in use in washing dishes;

Fig. 2 is a detailed view partly in section showing the arrangement of the parts forming the invention;

Fig. 3 is a detailed view partly in section taken on the line 3—3 of Fig. 2 showing the arrangement of spray mechanism and the detergent holder; and Fig. 4 is a detailed sectional view taken on the line 4—4 of Fig. 3.

The appliance consists generally of a spray nozzle which is made up of an elongated tube having lateral perforations on one side which serve as openings for the passage of fluid forming the spray. It is adapted to be held with these perforations facing downwardly so as to spray dishes lying in a sink or rack for cleaning purposes. Means are provided for closing one end of the tube preferably permanently. The other end of the tube is closed by a removable cap which may be screw threaded on the tube. The detergent holder is provided in the form of a tube of smaller diameter which is perforated and is insertable in the first tube. Means are provided for removably closing one end of this tube and for supporting it co-axially within the first tube. These means are mounted on the inner face of the cap which closes the first tube.

A water inlet is provided opening laterally and centrally into one side of the tube and an opposed handle extends laterally and centrally from another side of the tube.

A flexible hose leads from a faucet to the inlet and a covering sheet is provided having an aperture through which the handle fits so that the covering sheet may be supported by the tube to prevent splashing of water when the dishes are being sprayed.

The appliance is illustrated in use in Fig. 1. It consists generally of a tube 1 which is relatively elongated. On one side are a plurality of apertures 2 which serve for the passage of water to form a spray when the tube is held horizontally with the apertures pointing generally downwardly. One end of the tube is closed by a permanent closure 3. The other end is closed by a removable cover 4 such as a screw cap.

A water inlet 5 is provided extending laterally from one side of the tube at a point spaced from the area in which the apertures 2 are located. Directly opposite and on the other side is a handle 6 which extends laterally and centrally from the tube and from a side thereof spaced from both the inlet 5 and the apertures 2.

This handle may be spot welded to the tube as indicated in Fig. 2.

A flexible hose 7 is provided connected to the inlet 5. This hose may extend to a faucet 8 as indicated in Fig. 1 to supply water to the sprayer.

Within the sprayer is detergent holder 9 which consists of a tube 10 with lateral perforations 11, a closed end 12, and an open end 13. Detergent as indicated at 14 may be placed within this tube.

This tube is provided with means for closing its open end 13 and for supporting it co-axially of the tube 1 where it extends for a goodly portion of the length of the tube 1. The supporting means shown consist of a stud 15 which fits slideably within the open end 13 of the tube 10 where it is held in place frictionally. Any other form of fastening might be employed such as screw threads or a bayonet joint or the like.

A sheet 16 which may be of cloth or plastic material provided with a central aperture 17 may also be employed. The aperture 17 will receive the handle 6 so that the sheet may be placed over the appliance and be supported thereby as indicated in the right-hand portion of Fig. 1, the rest of the sheet overlying the dishes so that spray from the appliance will not be splashed out of the sink or receptacle in which the dishes are placed.

In use the tube 11 is filled with detergent 14. The water flows through the tube 7 and the inlet 5 into the tube 1. It then flows through the perforations 11 in the tube 10 leaching out or dissolving the detergent 14 which is sprayed with the water on the dishes to cleanse them. When the detergent is completely exhausted from the tube 10 clear water will flow for rinsing if desired.

Generally speaking, the tube 10 will hold adequate detergent for cleaning a sink full of dishes. It may be easily filled by simply removing the screw cap 4 from the tube 1 and sliding the tube 10 from the stud 15. It may then be replaced and the cap 4 screwed back on the tube 1.

The present invention may be embodied in other specific forms without departing from the spirit or essential attributes thereof. It is, therefore, desired that the present embodiment be considered in all respects as merely illustrative and not restrictive, reference being had to the appended claims rather than to the foregoing description to indicate the scope of the invention.

What is claimed is:

1. A dish washing appliance comprising a spray nozzle comprising an elongated tube having lateral perforations on one side for spraying water, means closing one end of said tube, a removable cap closing the other end of said tube, a detergent holder and distributor comprising a second tube of smaller diameter than and insertable in said first tube, said second tube having a closed end and an open end and perforations for the passage of water, means for supporting said second tube within said first tube and for removably closing the open end of said second tube comprising means mounted inwardly on and substantially centrally of said removable cap, a water inlet opening substantially centrally and laterally into said first tube at a point spaced from the perforations, a handle extending laterally and substantially centrally from said first tube at a point spaced from said inlet and from said perforations in said first tube, and a flexible hose leading to said inlet and a covering sheet having a substantially central opening to receive said handle said sheet overlying and being supported by said first tube.

2. A dish washing appliance comprising a spray nozzle comprising an elongated tube having lateral perforations on one side for spraying water, means closing one end of said tube, a removable cap closing the other end of said tube, a detergent holder and distributor comprising a second tube of smaller diameter than and insertable in said first tube, said second tube having a closed end and an open end and perforations for the passage of water, means for supporting said second tube within said first tube and for removably closing the open end of said second tube comprising means mounted inwardly on and substantially centrally of said removable cap, a water inlet opening substantially centrally and laterally into said first tube at a point spaced from the perforations, a handle extending laterally and substantially centrally from said first tube at a point spaced from said inlet and from said perforations in said first tube, and a flexible hose leading to said inlet.

References Cited in the file of this patent
UNITED STATES PATENTS

| | | |
|---|---|---|
| 1,510,062 | Kenney | Sept. 30, 1924 |
| 1,679,561 | Cantrell | Aug. 7, 1928 |
| 1,857,727 | Lindgren | May 10, 1932 |
| 1,974,355 | Dillinger | Sept. 18, 1934 |